United States Patent [19]

Carpenter

[11] 3,864,723

[45] Feb. 4, 1975

[54] SYSTEM FOR PROCESSING CHROMINANCE SIGNALS

[75] Inventor: David H. Carpenter, Fairfield, Conn.

[73] Assignee: Matsushita Electric Corporation of America, New York, N.Y.

[22] Filed: June 13, 1973

[21] Appl. No.: 369,526

[52] U.S. Cl. .................................... 358/28, 358/27
[51] Int. Cl. ............................................ H04n 9/38
[58] Field of Search ................ 178/5.4 HE, 5.4 AC; 358/27, 28, 32

[56] References Cited

UNITED STATES PATENTS 2,888,514 5/1959 Pritchard ............................ 178/5.4
3,647,941 3/1972 Andrade et al. .................... 178/5.4

*Primary Examiner*—Richard Murray
*Assistant Examiner*—R. John Godfrey

[57] ABSTRACT

A system for processing chrominance signals in a color television receiver which provides improved saturation of certain color levels without adversely effecting flesh tone color levels. The system includes circuitry for amplifying the color difference signals representative of flesh tones at a first amplification or gain and for amplifying the color difference signals representative of other colors at an increased amplification or gain.

13 Claims, 8 Drawing Figures

PATENTED FEB 4 1975

3,864,723

SHEET 2 OF 2

SYSTEM FOR PROCESSING CHROMINANCE SIGNALS

This invention relates generally to color television receivers and, more particularly, to a system for processing chrominance signals in a color television receiver.

Color television receivers generally utilize a cathode-ray display tube to exhibit color picture information contained in an input video signal received and processed by the receiver circuits. The display tube generally includes a viewing screen having a multiplicity of red-emitting, green-emitting and blue-emitting phosphor elements arranged on the inner surface of the faceplate of the tube in a predetermined array. By exciting these primary-colored phosphor elements with electron beams, the display tube can produce a wide variety of apparent colors to produce a color image representative of the transmitted scene.

At the transmitter, a color television camera is utilized to provide a red video signal, a green video signal and a blue video signal responsive to the scene scanned by the color camera. The red video signal is responsive to the red content of the scene being scanned by the color camera, the green video signal is responsive to the green content of the scene being scanned and the blue video signal is responsive to the blue content of the scene being scanned. In a compatible color television system, these three color signals, corresponding to the red, green and blue components of a picture as viewed by the television camera, are added prior to transmission in predetermined proportions to form a "luminance" signal. The luminance signal is representative of the brightness distribution in the picture and it is the luminance signal which is displayed on a conventional black and white television picture tube in a black and white television receiver. In addition to the luminance signal, difference signals between the red, green, and blue video signals and the luminance signals are formed prior to transmission and processed to provide a "chrominance" signal. The amplitude of the chrominance signal is responsive to the saturation of the transmitted image, i.e., the intensity of coloration. the phase of the chrominance signal is representative of the hue of the transmitted image. The luminance and chrominance signals are combined to form the color video signal which is transmitted by the television transmitter and received by the television receiver. In addition to the luminance and chrominance signals, a "burst" color reference signal is also transmitted which is utilized to provide a reference phase for detection of the chrominance signal in the television receiver.

In the television receiver, the luminance and chrominance signal components of the transmitted video signal are separated. The chrominance signal is demodulated, usually by synchronous detectors, to provide three color difference signals, i.e., red minus luminance signal (hereinafter referred to as "R–Y"), blue minus luminance signal (hereinafter referred to as "B–Y") and green minus luminance signal (heinafter referred to as "G–Y"). These color difference signals are then combined with the luminance signal to reproduct the red, green and blue video signals which are applied to the color television picture tube to provide the color image.

Most conventional color television receivers include controls for changing the brightness, saturation and hue of the color image displayed on the picture tube.

The saturation control, which varies the amplitude of the color difference signals, enables the viewer to modify the saturation of the color image responsive to the viewer's own subjective preference or in order to compensate for certain degradations in the transmitted video signal which causes the displayed color image to differ somewhat in color saturation from the color saturation of the actual image scanned by the camera.

However, existing controls for changing the saturation of the displayed color image have been less than satisfactory. Specifically, television viewers frequently desire a degree of saturation of the displayed color image which is relatively high such that certain colors in the image have a vivid and pleasing appearance. When the saturation control is utilized to provide such an image, certain other colors in the image, especially those generally referred to as "flesh tone" colors, become highly saturated and unnatural in appearance. On the other hand, if the saturation control is varied to provide an image having life-like flesh tone colors, the saturation of other colors in the displayed image appear muted or washed-out.

In attempts to remedy the foregoing problem, color television receivers according to the prior art have been devised with complex saturation controls. For example, saturation controls have been devised in which the phase of the chrominance signal is measured, a digital control signal responsive to the measured phase is generated and gating circuitry is provided responsive to the digital control signal for controlling the saturation of the chrominance signal. According to another system, it is necessary to provide complex martrixing for controlling the chrominance signal.

Not only are these systems relatively complex in operation and costly to manufacture, but they have not provided a displayed color image having the proper saturation of all colors in the displayed image.

Accordingly, it is a broad object of the present invention to provide a television receiver having an improved saturation control. A more specific object of the invention is to provide a television receiver having circuitry for processing chrominance information such that the saturation of the displayed color image is adjusted to provide a color image having desirable saturation of both flesh tone colors and other colors.

In one embodiment of the present invention, the R–Y, G–Y and B–Y color difference signals from the output of a chrominance demodulator are coupled to respective saturation processing circuits. The saturation processing circuits lineraly pass those color difference signals below a first predetermined amplitude (corresponding to flesh tone colors) at a first amplification or gain but pass those color difference signals above the amplitude (corresponding to non-flesh tone colors) with a different amplification or gain. The processed difference signals are coupled to respective color difference signal amplifiers.

In accordance with another embodiment of the invention, the R–Y, G–Y and B–Y color difference signals are coupled to respective channels, with each channel including a linear difference signal amplifier and a non-linear difference signal amplifier connected in parallel. Variable switch means, coupled to the output of each channel, are provided for controlling the amplification of the color difference signals and, therefore, for controlling the saturation of the displayed color image.

In accordance with yet a third embodiment of the present invention, the color difference signals are coupled to respective color difference signal amplifiers, which amplifiers each include switching means for adjusting the gain of the amplifier thereby adjusting the amplitude and, therefore, the saturation, of the color difference signals above a predetermined amplitude or value.

Other objects, features and advantages of the present invention will be understood by reference to the following detailed description of various presently preferred but nonetheless illustrative embodiments of the present invention, when taken in conjunction with the accompanying drawings, wherein.

Figures 1, 2, 3, 4:
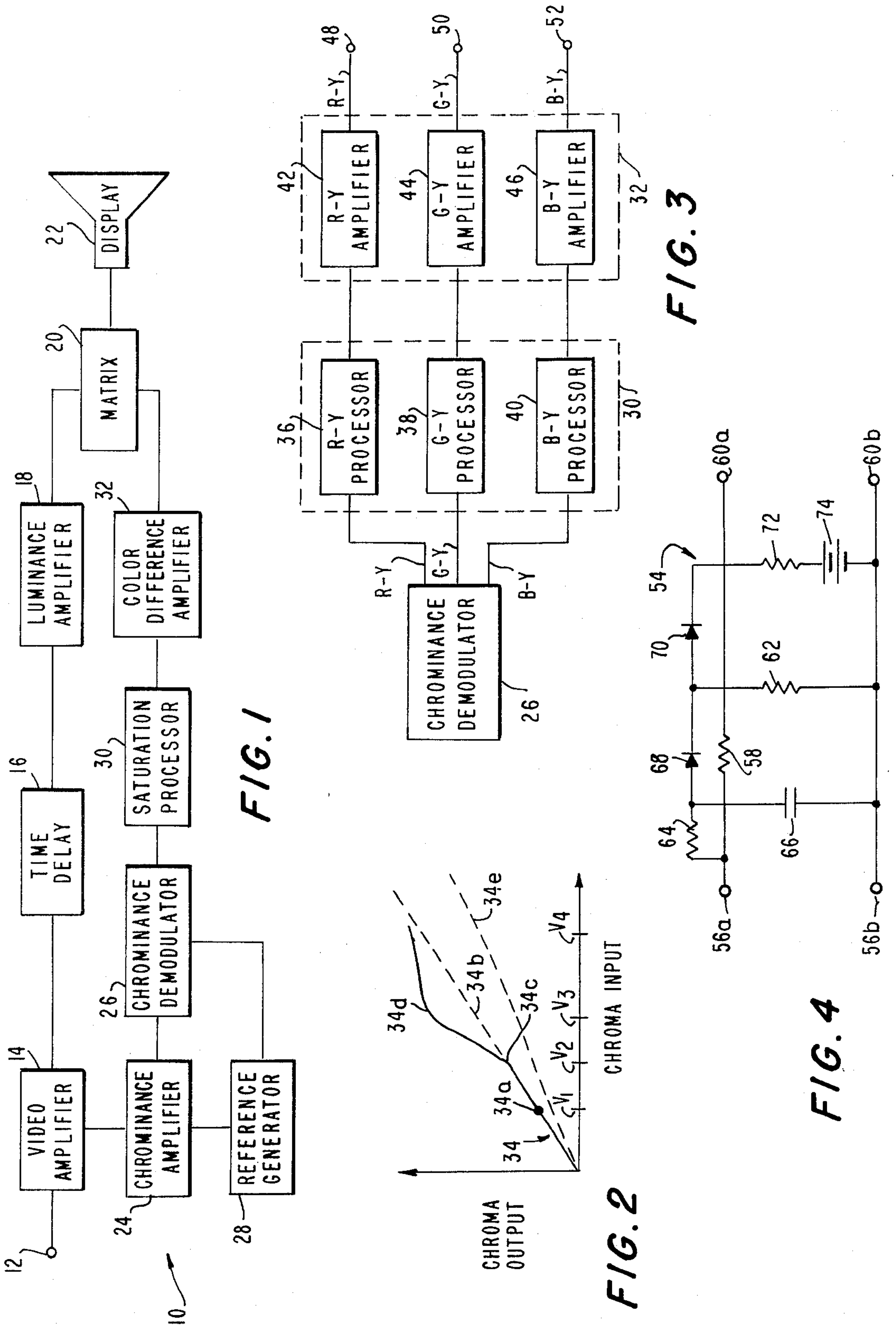
FIG. 1 is a block diagram of the video portion of a television receiver according to the present invention.
FIG. 2 is a graph of the input-output or transfer characteristics of a saturation processor and/or non-linear amplifier according to the present invention.
FIG. 3 is a block diagram of the chrominance demodulator, saturation processors and color difference signal amplifiers according to the present invention.
FIG. 4 is a schematic of a saturation processor of FIG. 3.

Referring now to the drawing and, more particularly, to FIG. 1 thereof, the video portion of a color television receiver according to the present invention is generally designated 10. Color television receiver 10 includes an input terminal 12 which is adapted to receive a conventional composite video signal transmitted from a color television transmitter (not shown). The composite video signal may be received at color television receiver 10 by an appropriate antenna (not shown).

The composite video signal, which includes both luminance and chrominance signals or components, is coupled to a video amplifier 14. One output of video amplifier 14 is coupled, via a time delay circuit 16, to a conventional luminance amplifier 18. The output from luminance amplifier 18 provides the conventional luminance component of the composite video signal, which signal is responsive to the brightness distribution of the tansmitted image and, in a monochromatic television receiver, provides the sole video information displayed on the television picture tube.

In a color television receiver, the luminance signal is combined with the color difference signals, for example, in a matrix or summing network 20, for providing the red, green and blue color video signals which are connected to a color television picture tube or similar display device 22. The other output from video amplifier 14 is coupled to a conventional chrominance amplifier 24 which passes the chrominance portion of the composite video signal to a conventional chrominance demodulator 26. As is generally understood in the art, a reference generator 28, responsive to chrominance amplifier 24, is utilized to provide a "burst" or reference phase signal which is used to demodulate the color difference signals in chrominance demodulator 26.

The output from chrominance demodulator 26, as is generally understood in the art, is a series of color diffrence signals, R–Y, G–Y, and B–Y. According to one embodiment of the present invention, the color difference signals are coupled, via a saturation processor or network 30, to a color difference amplifier 32. the color difference signals are then combined, in matrix 20, with the luminance signal in order to obtain the red video signal, the green video signal and the blue video signal which are applied to picture tube 22.

As explained hereinbefore, one problem with conventional color television receivers is the unevenness in the saturation of colors in the color image displayed on the color television picture tube. Specifically, if the amplitude of the color difference signals is increased in order to provide full or rich saturation of certain colors in the color image, the flesh tone colors in the image become distorted. On the other hand, if the amplitude of the color difference signals is decreased in order to provide real or life-like flesh tone, other colors in the displayed color image (i.e., purer reds, blues, greens, etc.) appear washed-out or otherwise muted.

In order to alleviate this problem, saturation processor 30 is inserted between chrominance demodulator 26 and color difference amplifier 32. Saturation processor 30 lineraly passes the color difference signals below a first predetermined level or amplitude (corresponding to flesh-tone colors) with a first amplification or gain. Saturation processor 30 also functions to increase the amplification of the color difference signals in a desired range above the first predetermined level (corresponding to colors other than flesh tone colors). As a result, the saturation of the displayed color image is such that flesh tone colors appear life-like while the other colors appear rich and full.

The operation of saturation processor 30 may be understood by reference to FIG. 2 which illustrates the input-out or transfer characteristics of the saturation processor. Specifically, saturation processor 30 is adapted to exhibit the transfer characteristics indicated by solid line 34. In a typical color television receiver, the amplitude of the color difference signals swing about a quiescent dc point **34*a*. In conventional color television receivers, the amplitude of the color difference signals coupled to matrix 20 are amplified linearly at a constant amplification or gain, as indicated by dashed-line 34*b* in FIG. 2. Even varying a saturation control merely changes the slope of curve 34*b* as indicated by dashed-line 34*e*.**

However, in order to provide a more realistic representation of both flesh tone colors and other colors, saturation processor 30 varies the amplification of the color difference signals for certain color difference signals. Specifically, the color difference signals are linearly amplified, at a first amplification or gain, only for those signals below a first predetermined level or amplitude. Thus, color difference signals having an amplitude below a first predetermined value, $V_2$, (corresponding to flesh tone colors) are amplified linearly at a first amplification. This corresponds to the transfer characteristic below point **34*c* on curve 34. At point 34*c* (corresponding to color difference signals with amplitudes above $V_2$), the amplification increases and saturation processor 30** passes the color difference signals with an increased amplification or gain. At a second break point 34*d*, the amplification or gain of processor 30 may again change to decrease the amount of amplification of color difference signals having amplitudes above $V_3$ (see FIG. 2). Thus, to summarize the operation of saturation processor 30, the saturation processor is provided with an amplitude-dependant gain so that color difference signals having amplitudes below $V_2$ are amplified at a first linear gain; color difference signals having amplitudes between $V_2$ and $V_3$ are amplified at an increased gain; and color difference signals having amplitudes between $V_3$ and $V_4$ are amplified at yet another gain indicated by the transfer curve above break point 34*d* of FIG. 2.

Although it is possible to provide a single saturation processor, such as saturation processor 30 of FIG. 1, to process all three color difference signals, it is advantageous to process each color difference signal in its own saturation processor. Accordingly, as indicated in FIG. 3, saturation processor 30 may include separate R–Y, G–Y and B–Y color difference signal saturation processors 36, 38 and 40, respectively, which are coupled to individual R–Y, G–Y and B–Y amplifiers 42, 44 and 46. Thus, R–Y saturation processor 36 and R–Y amplifier 42 operate on the R–Y color difference signal output from chrominance demodulator 26 to provide an R–Y signal at output terminal 48. This R–Y output signal is processed and amplified such that at least a portion of the R–Y color difference signals having amplitudes representative of non-flesh tone colors are amplified to a greater extent than the R–Y color difference signals having amplitudes representative of flesh tone colors. In a similar manner, G–Y saturation processor 38 G–Y amplifier 44 provide a G–Y color difference signal at output terminal 50 and B–Y saturation processor 40 and B–Y amplifier 46 provide a B–Y color difference signal at output terminal 52, which color difference signals have been amplified according to the transfer characteristics illustrated in FIG. 2 and as discussed above.

FIG. 4 shows a saturation processor (generally designated 54) according to one embodiment of the invention including input terminals 56*a*, 56*b* adapted to receive a color difference signal from chrominance demodulator 26. The color difference signal impressed across input terminals 56*a*, 56*b* is connected, via a resistor 58, to output terminals 60*a*, 60*b*. Connected between the output side of resistor 58 and terminal 60*b* is a resistor 62 which, along with resistor 58, forms a voltage divider. Circuit 54 includes a resistor 64 and a capacitor 66 in series between input terminal 56*a*, 56*b*. A breakdown device, such as diode 68, is connected between the juncture of resistor 64 and capacitor 66 and the juncture of resistors 58 and 62. Another breakdown device, such as a diode 70, is connected in series with a resistor 72 and a DC battery 74 between the output terminals 60*a*, 60*b*.

In operation, circuit 54 is a passive network for providing an input-output or transfer characteristic similar to that illustrated in FIG. 2. Specifically, for color difference signals up to a first predetermined amplitude (corresponding to $V_2$ in FIG. 2), resistor 50 and resistor 62 form a voltage dividing network and a predetermined percentage of the input signal is delivered to output terminals 60*a*, 60*b*. When the input amplitude of the color difference signal rises above a certain value, corresponding to $V_2$ in FIG. 2, diode 68 becomes forward biased, and a conduction path, formed by resistor 64 and diode 68, is formed in parallel with resistor 58. This changes the input-output or transfer characteristics of the circuit, as indicated by breakpoint 34*c* in FIG. 2, and more of the color difference signal coupled to the input of circuit 54 is connected to the input of the color difference amplifier. For still higher input amplitudes, i.e., color difference signals having amplitudes above $V_3$ in FIG. 2, diode 70, which was previously reversed biased by the voltage supplied from battery 74, becomes forward biased. This results in resistor 72 and diode 70 being placed in parallel with resistor 62 so that the transfer characteristic of circuit 54 changes, as indicated by the curve above breakpoint 34*d* in FIG. 2. The combined effect of circuit 54 is thus to provide a circuit having characteristics similar to that illustrated in FIG. 2.

The color difference signal available at terminals 60*a*, and 60*b* is coupled to one of the conventional linear amplifiers, such as R–Y color difference amplifier 42, for providing an R–Y color difference signal at a terminal 48. The color difference signal output from amplifier 46, after being added to the luminance signal provided from luminance amplifier 18, provides the red color video signal which is applied to color television tube 22.

FIG. 1 illustrates the use of a saturation processor 30 disposed between conventional chrominance demodulator 26 and color difference amplifier 23. FIG. 3 shows that saturation processor 30 and color difference amplifier 32 may include separate channels, with each channel including a separate saturation processor and a separate amplifier for each of the three color difference signals. It should be noted that while as previously disclosed it is the saturation processor(s) which provide the input-output characteristics of FIG. 2, the color difference amplifier (for example, color difference amplifier 32 of FIG. 1 or the separate color difference amplifiers 42, 44 and 46 of FIG. 3) may directly provide the input-output characteristics similar to that of FIG. 2, if so desired.

Figure 5:
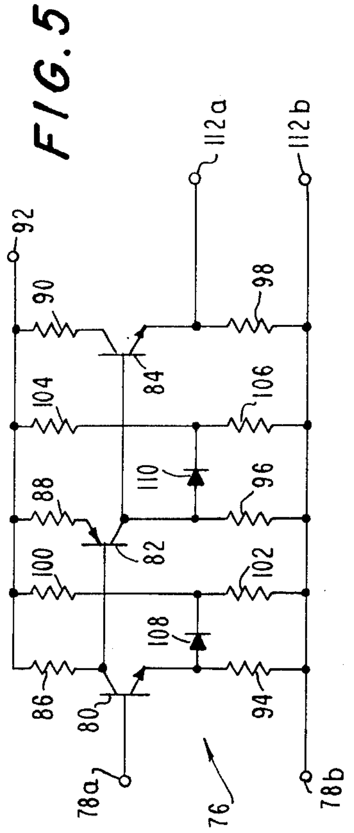
FIG. 5 is a schematic of a non-linear amplifier according to the present invention.

Accordingly, FIG. 5 is a schematic diagram of a non-linear amplifier having transfer characteristics similar to curve 34 of FIG. 2. Specifically, FIG. 5 illustrates a non-linear amplifier, generally designated 76, which may be used in color television receiver 10, thereby eliminating the need for separate saturation processor 30 or processors 36, 38 and 40. Non-linear amplifier 76 includes input terminals 78*a*, 78*b* which are adapted to receive the color difference signal from chrominance demodulator 26. As indicated hereinbefore, all three color difference signals may be coupled to non-linear amplifier 76, although it is advantageous for each one of the color difference signals to have a separate non-linear amplifier since it may be desirable for these separate color difference signals to be amplified differently. In any case, non-linear amplifier 76 includes transistors 80, 82 and 84, which transistors are adapted to be connected, via respective resistors 86, 88 and 90 to a source of DC supply (not shown) available at terminal 92. Resistors 94, 96 and 98 are connected between supply terminal 92 and input terminal 78*b* as are resistors 104, 106. A diode 108 is connected, at one side thereof, to the juncture of resistor 94 and the emitter of transistor 80 and, at the other side thereof, to the juncture of resistors 100, 102. Diode 110 is connected, at one side thereof, to the juncture of resistor 96 and the collector of transistor 82 and, at the other side thereof, to the juncture of resistors 104, 106. The output from non-linear amplifier 76 is taken across resistor 98 via output terminals 112*a*, 112*b*.

In operation, transistors 80, 82 and 84 form a non-inverting amplifier for those positive input signals less than the DC voltage supplied at DC supply terminal 92. As indicated hereinbefore, the input voltage, which corresponds to the color difference signals, swings about a quiescent level, generally indicated by point 34*a* in FIG. 2. For small excursions about the quiescent DC level, that is, for color difference signals up to a first predetermined amplitude $V_2$ (see FIG. 2), diodes 108, 110 are reverse biased and circuit 76 functions as a conventional linear amplifier. However, as the amplitude of the color difference signal applied to terminals 78*a*, 78*b* increases (i.e., for excursions above $V_2$), diode 108 becomes forward biased and resistors 100, 102 are connected in parallel with resistor 94. This, in turn, increases the gain of transistor 80. The transfer characteristic of circuit 76 changes at break point 34*c* illustrated in FIG. 2. When the amplitude of the color difference signal increases to yet another predetermined amplitude (corresponding to $V_3$ in FIG. 2), diode 110 becomes forward biased and resistors 104, 106 are connected in parallel with resistor 96. This reduces the gain of transistor 82 which changes the transfer characteristics, corresponding to break point 34*d* in FIG. 2. Non-linear amplifier 76 of FIG. 5 thus has an input-output or transfer characteristic substantially similar to that illustrated in FIG. 2.

Figure 6:
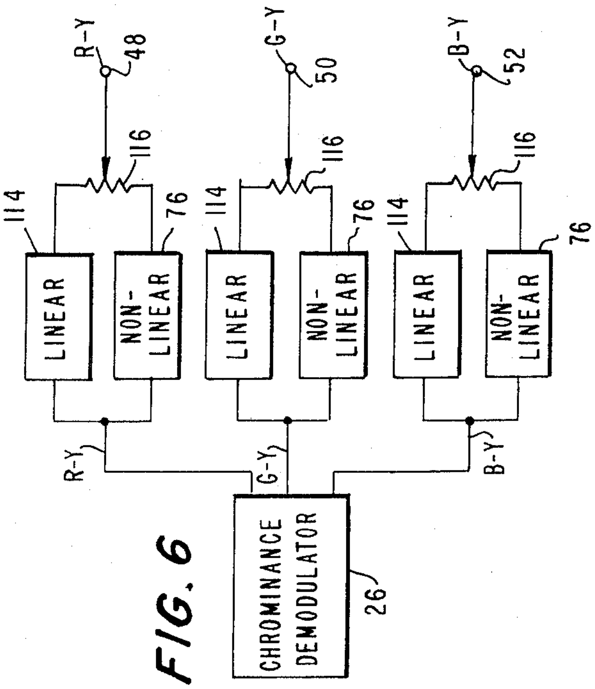
FIG. 6 is a block diagram of another embodiment according to the present invention.

Non-linear amplifier 76 of FIG. 5 may also be utilized in the system of FIG. 6 which illustrates a system according to another embodiment of the present invention. Specifically, the R–Y G–Y and B–Y color difference signal outputs from chrominance demodulator 26 are coupled to respective output terminals 48, 50, 52 by way of separate channels each including a linear and non-linear amplifier. Thus the R–Y color difference signal is coupled to output terminal 48 by way of a channel which includes a conventional linear amplifier 114 connected in parallel to a non-linear amplifier, such as non-linear amplifier 76 of FIG. 5. The outputs from linear amplifier 114 and non-linear amplifier 76 are connected to a potentiometer 116 which may be adjusted to vary the output provided at output terminal 48. Thus, depending on the position of potentiometer 116, the amplitude of the color difference signal provided at output terminal 48 may be varied to vary the saturation of the colors of the displayed color image provided at picture tuve 22.

In a similar manner, the G–Y color difference signal output from chrominance demodulator 26 and the B–Y color difference signal output from chrominance demodulator 26 are coupled to parallel connected linear amplifiers 114 and non-linear amplifiers 76, with the output of each pair or channel controlled by a potentiometer 116 for varying the signal at output terminal 50 or output terminal 52. The individual potentiometers 116 may share a common control shaft or lever (not shown), if so desired. Thus, adjustment of the potentiometers 116 provides a variable adjustment between the output from linear amplifiers 114 and non-linear amplifiers 76. As a result, the amplitude of the color difference signals and, therefore, the saturation of the image displayed on color television picture tube 22, may be varied.

Figure 7:
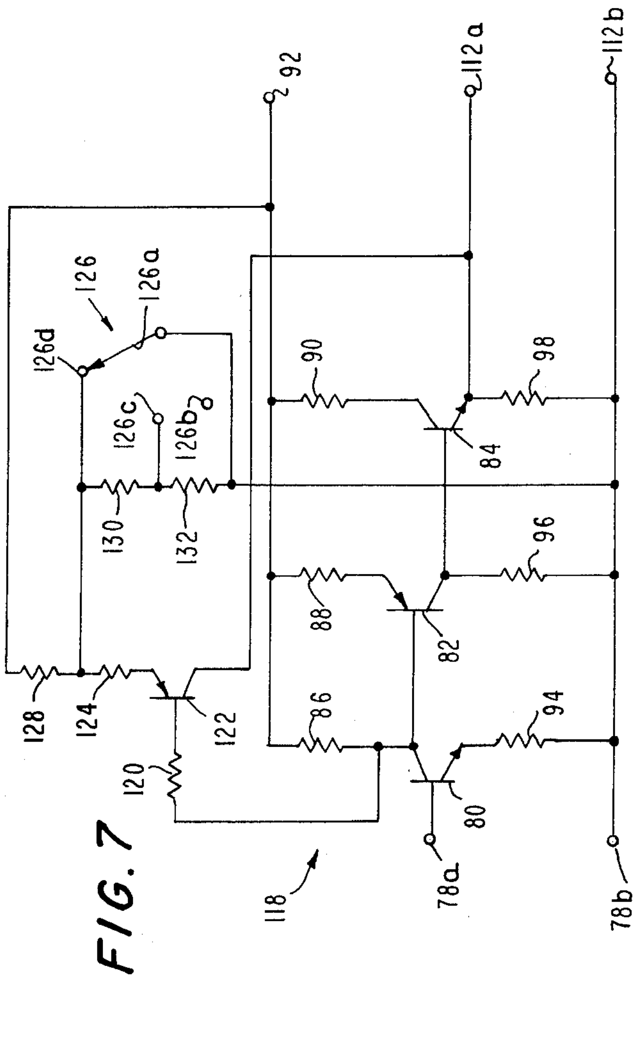
FIG. 7 is a schematic of a non-linear amplifier according to another embodiment of the present invention.

FIG. 7 illustrates another non-linear amplifier generally designated 118, according to another embodiment of the present invention, which may be utilized in order to provide some variation in the saturation of the color image displayed at color television picture tube 22. Non-linear amplifier 18 includes many of these same components heretofore described in connection with non-linear amplifier 76 of FIG. 5 and, accordingly, these similar components have been designated with these same reference numerals. Thus, non-linear amplifier 118 includes transistors 80, 82 and 84, resistors 86, 88 and 90, input terminals 78*a*, 78*b*, output terminals 112*a*, 112*b*, DC supply terminal 92 and resistors 94, 96 and 98. In addition thereto, the collector of transistor 80 is connected, via a resistor 120, to the base of a transistor 122. The collector of transistor 122 is connected to output terminal 112*a* while the emitter of this transistor is connected to a resistor 124. Non-linear amplifier 118 also includes a three position switch, generally designated 126, which switch includes a switch arm 126*a* adapted to be connected to switch terminals 126*b*, 126*c* or 126*d*. Terminal 126*d* is connected to the juncture of resistor 124 and a resistor 128, the other side of resistor 128 being connected to DC supply terminal 92. Terminals 126*c* and 126*d* are connected together, via a resistor 130. Additionally, terminal 126*c* is connected to switch arm 126*a* via a resistor 132. The juncture of resistor 132 and switch arm 126*a* is also connected to input terminal 78*b*. Terminal 126*b* of switch 126 is an "open" terminal which is not electrically connected to any other component in non-linear amplifier 118.

Figure 8:
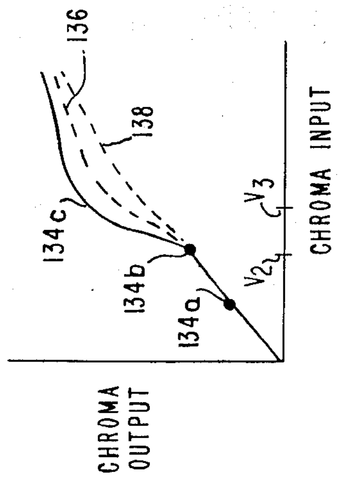
FIG. 8 is a graph of the input-output or transfer characteristics of the amplifier of FIG. 7.

The operation of non-linear amplifier 118 may be readily understood by reference to FIGS. 7 and 8, the latter illustrating the input-output or transfer characteristics of the non-linear amplifier. Specifically, transistors 80, 82 and 84 form a relatively low gain non-inverting amplifier. As indicated hereinbefore, the input signal at terminal 78*a*, 78*b* (which input signal corresponds to one of the color difference signals provided from chrominance demodulator 26), swings about a quiescent positive DC level, indicated by point 134*a* on FIG. 8. For color difference signals of amplitudes less than or equal to a predetermined value $V_2$, amplifier 118 displays a constant gain and amplifies the color difference signal input with a predetermined amplification in a relatively linear fashion, as indicated by the curve of FIG. 8 below breakpoint 134*b*. When the input signal rises above amplitude $V_2$, the inverted signal at the collector of transistor 80 swings in a negative direction causing base current to flow in transistor 122. This, in turn, causes collector current to flow in transistor 122, with such collector current flowing through resistor 98. As a result, transistor 122 forms a relatively high gain amplifier, and the gain of the amplifier, as indicated in FIG. 8, increases between break point 134*b* and break point 134*c*. When the amplitude of the color difference signal reaches an amplitude corresponding to $V_3$, the voltage at the collector of transistor 122 approaches the voltage at the base thereof. Transistor 122 effectively "bottoms" and the gain of the amplifier decreases, as indicated by the shape of the transfer curve above break point 134*c*.

Switch 126 is provided to vary in the shape of the transfer characteristics above break point 134*b*, that is, switch 126 varies the gain of non-linear amplifier 118 for color difference signals above $V_2$. Specifically, when switch arm 126 engages switch terminal 126*d*, the gain of the amplifier is given by the input-output or transfer characteristic shown in solid line in FIG. 8. On the other hand, when switch arm 126*a* engages switch terminal 126*c*, the bias on the base of transistor 122 increases and the degree of amplification or gain above break point 134*b* is reduced, as indicated by curve 136. Still further, when switch arm 126*a* engages switch terminal 126*b*, the base of transistor 122 is heavily biased and transistor 122 is virtually cut off from much of the operating range of the amplifier 118. Under these conditions, a relatively low gain or amplification is provided, via transistors 82 and 84, as indicated by the transfer characteristic curve 138.

In summary, the present invention is adapted to be utilized in a color television receiver for modifying the color difference signal outputs from a chrominance demodulator in order to provide improved saturation of the color image displayed on a color television picture tube. The invention provides strong or highly saturated colors for color difference signals above a predetermined amplitude without adversely effecting the saturation of flesh tone colors corresponding to color difference signals below a predetermined amplitude. This is accomplished by varying the gain or amplification of the color difference amplifier or amplifiers. As indicated in FIGS. 1 and 3, the invention may include a separate saturation processor or processors which modify the signal coupled to the color difference amplifier or amplifiers. Alternatively, and as indicated in FIG. 5 and FIG. 7, the color difference amplifier or amplifiers may itself include circuitry for modifying the transfer characteristics thereof. Provision is also included for allowing the viewer to have some choice in varying the saturation of the color image displayed on the color television picture tube. For example, the viewer may vary potentiometer 116 to control the output from either linear amplifier 114 or non-linear amplifier 76. Alternatively, and as illustrated in FIGS. 7 and 8, the non-linear amplifier may include a switch for varying the transfer characteristics of the amplifier.

Obviously, modifications of the present invention are possible in light of the above teachings. Accordingly, it should be noted that the embodiments heretofore described are merely exemplary of the principles of the present invention and numerous other embodiments may be devised within the spirit and scope of the present invention and delineated by the appended claims.

What is claimed is:

1. A color television receiver adapted to receive a composite video signal having a chrominance signal and a luminance signal and for displaying a color image on a display device comprising chrominance demodulator means for providing a first color difference signal, a second color difference signal and a third color difference signal, a first non-linear amplifier connected to said first color difference signal, said first non-linear amplifier adapted to amplify said first color difference at a first amplification for first color difference signals less than a first predetermined amplitude and for increasing the amplification of said first color difference signal for first color difference signals greater than said first predetermined amplitude; a second non-linear amplifier connected to the output of said second color difference signal, said second non-linear amplifier adapted to amplify said second color difference signal at a first amplification for second color difference signals less than a first predetermined amplitude and for increasing the amplification of said second color difference signal for second color difference signals greater than said first predetermined amplitude; and a third non-linear amplifier connected to said third color difference signal, said third non-linear amplifier adapted to amplify said third color difference signal at a first amplification for third color difference signals less than a first predetermined amplitude and for increasing the amplification of said third color difference signals for third color difference signals greater than said first predetermined amplitude.

2. The invention according to claim 1 wherein said first, second and third non-linear amplifiers amplify their respective color difference signals at a decreased amplification for respective color difference signals above a second predetermined amplitude.

3. The invention according to claim 1 further comprising first, second, and third linear amplifiers adapted to be connected in parallel with the respective first, second and third non-linear amplifiers and means connected to the outputs of said linear and non-linear amplifiers for controlling the amplification of said first, second and third color difference signals.

4. The invention according to claim 1 wherein said first, second and third non-linear amplifiers include respective means for varying the amplification of said respective first, second and third color difference signals for color difference signals above said first predetermined amplitude.

5. A color television receiver adapted to receive a composite video signal including a chrominance signal and a luminance signal for displaying a color image on a display device comprising means for providing a chrominance signal, means for amplifying said chrominance signal including means for increasing the amplification of said chrominance signal for at least a portion of said chrominance signal having amplitudes above a first predetermined amplitude and means for decreasing the amplification of said chrominance signal for at least a portion of said chrominance signal having amplitudes above a second predetermined amplitude for controlling the saturation of the color image displayed on said display device.

6. A color television receiver adapted to receive a composite video signal including a chrominance signal and a luminance signal for displaying a color image on a display device comprising means for providing a chrominance signal, means for amplifying said chrominance signal including means for varying the gain of said amplifying means such that the gain of said amplifying means is maintained at a first predetermined value for that portion of said chrominance signal below a first predetermined amplitude and such that the gain of said amplifying means is increased for that portion of said chrominance signal between said first predetermined amplitude and a second predetermined amplitude for controlling the saturation of the color image displayed on said display device.

7. The invention according to claim 6 wherein said means for varying the gain of said amplifying means decreases the gain of said amplifying means for that portion of said chrominance signal above said second predetermined amplitude.

8. The invention according to claim 6 further comprising means for selectively varying the gain for that portion of said chrominance signal above said first predetermined amplitude.

9. In a color television receiver adapted to receive a composite video signal including a chrominance signal and a luminance signal for displaying a color image on a display device, an automatic color image saturation control system comprising means for separating said composite video signal into said chrominance signal and said luminance signal, means for demodulating said chrominance signal to provide a first color difference signal, a second color difference signal, a third color difference signal, means for amplifying said color difference signals including means for individually varying the gain of said amplifying means independently of the phase of said chrominance signal such that said color difference signals up to a first predetermined amplitude are amplified with a first predetermined gain and such that said color difference signals above said first predetermined amplitude are amplified at a second gain said second gain being greater than said first gain.

10. The invention according to claim 9 wherein said means for varying the gain of said amplifying means includes at least one saturation processor disposed between said amplifying means and said demodulating means.

11. The invention according to claim 10 wherein said saturation processor includes a first saturation processor, a second saturation processor and a third saturation processor connected, respectively, to said first, second and third color difference signals for varying the color difference signals coupled to said amplifying means.

12. In a color television receiver adapted to receive a composite video signal including a chrominance signal and a luminance signal for displaying a color image on a display device, an automatic color image saturation control system comprising means for separating said composite video signal into said chrominance signal and said luminance signal, means responsive to said chrominance signal for controlling the amplitude of said chrominance signal independently of the phase of said chrominance signal including means adapted to amplify said chrominance signal at a first amplification for chrominance signals less than a first predetermined amplitude and for amplifying said chrominance signals at a second amplification for chrominance signals greater than said first predetermined amplitude for controlling the saturation of the color image displayed on said display device.

13. The invention according to claim 12 wherein said automatic saturation control system further includes means for amplifying said chrominance signal at a third amplification for chrominance signals having amplitudes above a second predetermined amplitude.

* * * * *